United States Patent [19]

Chen et al.

[11] Patent Number: 5,668,523

[45] Date of Patent: Sep. 16, 1997

[54] MAGNETORESISTIVE SENSOR EMPLOYING AN EXCHANGE-BIAS ENHANCING LAYER

[75] Inventors: Mao-Min Chen; Kenneth Ting-Yuan Kung, both of San Jose; Ching Hwa Tsang, Sunnyvale, all of Calif.

[73] Assignee: International Business Machines Corporation, Armonk, N.Y.

[21] Appl. No.: 449,605

[22] Filed: May 23, 1995

Related U.S. Application Data

[62] Division of Ser. No. 174,748, Dec. 29, 1993, abandoned.

[51] Int. Cl.$^6$ ................................................ G11B 5/39
[52] U.S. Cl. ............................................. 338/32 R; 360/113
[58] Field of Search ........................... 360/113; 428/611, 428/649 EC, 694 MM, 694 TM; 427/131; 365/33, 158, 173; 73/514.31; 338/32 R; 324/179, 207, 21, 252

[56] References Cited

U.S. PATENT DOCUMENTS

| | | | |
|---|---|---|---|
| 4,103,315 | 7/1978 | Hempstead et al. | 360/110 |
| 4,489,357 | 12/1984 | Van Ooijen et al. | 360/113 |
| 4,639,806 | 1/1987 | Kira et al. | 360/113 |
| 4,663,685 | 5/1987 | Tsang | 360/113 |
| 4,713,708 | 12/1987 | Krounbi et al. | 360/113 |
| 4,782,413 | 11/1988 | Howard et al. | 360/113 |
| 4,785,366 | 11/1988 | Krounbi et al. | 360/113 |
| 4,809,109 | 2/1989 | Howard et al. | 360/113 |
| 4,825,325 | 4/1989 | Howard | 360/113 |
| 4,967,298 | 10/1990 | Mowry | 360/113 |
| 5,014,147 | 5/1991 | Parkin et al. | 360/113 |
| 5,574,605 | 11/1996 | Baumgart et al. | 360/113 |

OTHER PUBLICATIONS

Mee et al., Magnetic Recording, vol. 1: Technology, Chapter 4: Recording Heads, McGraw-Hill, 1987, pp. 298–300.
Mee et al, Recording Media, Chapter Three, pp. 102–109.

*Primary Examiner*—John H. Wolff
*Assistant Examiner*—Kevin M. Watkins
*Attorney, Agent, or Firm*—Baker, Maxham, Jester & Meador

[57] ABSTRACT

An exchange-biased magnetoresistive (MR) read transducer in which the MR layer composition is changed at the interface with an antiferromagnetic layer, which is in direct contact with the ferromagnetic MR layer. The exchange-bias field strength $H_{UA}$ in the MR layer is increased at room temperature by adding a specially-optimized transition region in the ferromagnetic MR layer at the interface. The percentage of iron in the ferromagnetic alloy varies from a higher value at the interface to a lower value at the opposite end of the transition region. The higher iron ratio at the antiferromagnetic interface enhances the exchange-bias field $H_{UA}$ and the lower iron ratio throughout the bulk of the ferromagnetic MR layer maintains the lower coercivity preferred in the layer, thereby enhancing the longitudinal bias field with respect to the MR coercivity. Advantageously, the enhanced longitudinal bias effect of the special ferromagnetic transition region does not reduce the critical temperature $T_{cr}$ at which the temperature-dependent exchange-bias field $H_{UA}(T)$ approaches zero.

14 Claims, 7 Drawing Sheets

MAGNETORESISTIVE SENSOR EMPLOYING AN EXCHANGE-BIAS ENHANCING LAYER

CROSS-REFERENCES TO RELATED APPLICATIONS

This application is a division of application Ser. No. 08/174,748, filed Dec. 29, 1993, now abandoned.

BACKGROUND OF THE INVENTION

1. Field of the Invention

This invention relates generally to magnetoresistive (MR) sensors for reading data signals stored in magnetic media and specifically to a MR sensor with a special ferromagnetic transition layer for improved exchange-biasing of the ferromagnetic sensing layer.

2. Description of the Related Art

In magnetoresistive (MR) sensors, it is important to provide magnetic bias to suppress domain formation in the MR film element. A MR sensor detects magnetic field signals through the resistance changes in a thin film ferromagnetic MR strip arising from changes in external magnetic flux. Two magnetic bias fields are usually preferred for optimal MR element operation. A transverse bias field is usually provided to bias the MR strip so that it exhibits a linear response to external magnetic flux. This transverse bias field is normal to the plane of the magnetic recording medium and parallel to the surface of the MR strip. The second bias field is a longitudinal bias field that extends parallel to the surface of the magnetic medium and parallel to the lengthwise dimension of the MR strip. This longitudinal bias operates to suppress magnetic domain formation. Troublesome discontinuous changes in sensitivity and linearity occur in the outputs of thin-film MR sensors because the sensor dimensions are of the same order as domain dimensions. These discontinuities are known in the art as "Barkhausen noise" and are the result of sudden chaotic changes in domain wall positions with changes in applied magnetic field. The two simplest methods for avoiding Barkhausen noise in MR sensors are (a) to eliminate all domain walls or (b) to force such domain walls to be immobile.

A useful approach to eliminating domain walls in thin-film MR strips is to force the strip into a single domain by applying a permanent external magnetic bias. The related art is replete with useful methods for providing such external magnetic bias to thin-film MR strips. One approach to obtaining unidirectional anisotropy in the MR strip is through exchange interaction at the atomic boundary between an antiferromagnetic material and the ferromagnetic material making up the MR strip. Exchange anisotropy is well-known in the art as a form of surface anisotropy located at the phase boundary between a ferro- or ferrimagnet and an antiferromagnet. For instance, exchange anisotropy is known to occur on cobalt particles with an antiferromagnetic cobalt monoxide surface layer. The exchange coupling of the last plane of the magnetically-fixed antiferromagnetic lattice to the first ferro- or ferrimagnetic lattice plane leads to unidirectional vector anisotropy. This vector anisotropy behaves like a dc-bias field that displaces the hysteresis loop along the H axis and causes a finite anhysteretic magnetization in zero external field.

In U.S. Pat. No. 4,103,315, Robert D. Hempstead, et al. disclose a technique for minimizing domain walls in thin-film magnetic transducers that relies on the magnetic biasing effect of exchange anisotropy. Hempstead, et al. provide extensive detailed discussion of thin-film magnetic materials and fabrication methodology related to exchange bias applications and their patent is entirely incorporated herein by this reference.

Subsequent to the work by Hempstead, et al., many practitioners have proposed refinements to the exchange-biasing technique to incrementally improve MR sensor performance. In U.S. Pat. No. 4,663,685, Ching H. Tsang discloses a MR read transducer assembly in which the thin-film MR layer is longitudinally biased by exchange anisotropy only in the end regions. The bias field is developed by a thin film of antiferromagnetic material deposited in direct contact with the MR layer over the end regions. Limiting the longitudinal bias field to the end regions permits a central transverse bias field to maintain the central region of the MR layer in a linear response mode.

In U.S. Pat. No. 4,639,806, Toru Kira et al. disclose a thin-film magnetic sensor strip that is exchange-coupled to an adjacent permanently-magnetized ferromagnetic layer of higher coercivity to provide a longitudinal bias consisting of a combination of permanent magnetic field and exchange-bias field.

U.S. Pat. No. 4,713,708, issued to Mohamad T. Krounbi et al., discloses an exchange-biased MR sensor assembly that includes a third thin layer of soft magnetic material, where the antiferromagnetic exchange-biasing layer is removed in the middle region of the MR strip leaving only the thin film of soft magnetic material separated from the MR layer in the central region only by a decoupling layer that interrupts the exchange coupling so that transverse bias is produced only in the central region upon connection of a bias source to conductor leads, which are connected to the MR strip within the end region.

In U.S. Pat. No. 4,782,413, James K. Howard et al. disclose a MR sensor that uses an iron-manganese (FeMn) alloy as the antiferromagnetic exchange-biasing layer. The presence of the body-centered-cubic alpha iron-manganese alloy improves the longitudinal exchange bias in the ferromagnetic MR layer.

In U.S. Pat. No. 4,785,366, Mohamad T. Krounbi et al. disclose a MR read transducer that is exchange-biased over its entire length by a continuous thin film of antiferromagnetic material with a thin film of sob magnetic material disposed in the passive end regions such that the bias directions in different regions of the bias film are defined to produce optimum device performance. Krounbi et al. initialize the exchange-biasing layer to produce an effective bias field that is directed substantially longitudinally within the passive end regions and at some selected angle within the active central region of the MR sensor layer. Thus, the exchange-biasing layer is used to produce both the longitudinal and transverse bias fields.

In U.S. Pat. No. 4,809,109, James K. Howard et al. disclose an improved MR read transducer having an exchange-biased MR layer that is subjected to a thermal annealing process to create a ternary antiferromagnetic alloy at the junction between the ferromagnetic and antiferromagnetic layers. The ternary alloy provides the desired exchange-bias field at room temperature and exhibits an unusually high ordering temperature. Howard et al. neither consider nor suggest forming a variable-composition alloy layer in the ferromagnetic element to improve exchange-bias field levels, restricting their discussion to forming a new antiferromagnetic alloy at the interface between the two original films.

In U.S. Pat. No. 4,825,325, James K. Howard discloses a MR sensor that is longitudinally biased by the exchange anisotropy formed between the MR layer and a very thin layer of antiferromagnetic material, where the entire structure is covered with a protective film to prevent oxidation damage to the materials during subsequent thermal cycling.

In U.S. Pat. No. 4,967,298, Greg S. Mowry discloses an elongated MR sensor strip that is longitudinally biased to maintain a single domain sense region using exchange-biasing material atomically coupled to the strip at the ends outside of the central sense region in a manner similar to that of Krounbi et al above. Mowry's sensor strip is disposed between leading and trailing magnetic pole elements and the sensor strip is shielded from the trailing pole by a third shielding element.

In U.S. Pat. No. 5,014,147, Stuart S. P. Parkin et al. disclose an exchange-biased MR sensor strip employing an antiferromagnetic layer composed of iron and manganese alloyed in specified proportions. Parkin et al. specify the $Fe_{(1-x)}Mn_x$ alloy, where x is within the interval of [0.3, 0.4].

Clearly, numerous practitioners in the art employ NiFe/FeMn exchange-biased films in MR sensor assemblies for domain suppression. In doing so, their exchange-bias field ($H_{UA}$) is typically applied along the length of the MR sensor element. The magnitude of $H_{UA}$ must exceed a particular minimum to counteract demagnetization and coercivities in the MR material.

For instance, a NiFe/FeMn exchange-biased film with, say, 400 Å (40 nm) of NiFe and 500 Å of FeMn provides an exchange-bias field of about 25 Oersteds (2000 A/m). This 25 Oersted field is certainly adequate for most MR sensor geometries, especially for very long (i.e.: over 100 micron) designs. Unfortunately, this exchange-bias field magnitude varies sharply with changes in ambient temperature. For film thicknesses in the 400 Å/500 Å range, $H_{UA}(T)$ varies from around 25 Oersteds at room temperature to zero at a critical temperature $T_{cr}$ of about 150° C. Because this variation is substantially linear, $H_{UA}$ is reduced to only 12 Oersteds at the maximum device operating temperature of 90° C. This 12 Oersted field value is generally only minimally sufficient to overcome the MR sensor coercivity of perhaps 10 Oersteds. There is accordingly a clearly-felt need for exchange-biased film structures that provide a higher exchange-bias field value at $H_{UA}$ at maximum device operating temperature.

One approach for increasing the exchange-bias field $H_{UA}$ at 90° C. is to introduce film changes to somehow increase $H_{UA}$ at room temperature (20° C.) without incurring any significant reduction in critical temperature $T_{cr}$.

The decline in $H_{UA}$ at higher operating temperatures is even more of a problem when using one of the corrosion-resistant FeMnX alloys (where X includes one of a group of elements including Cr, Rh and Ti) as the antiferromagnetic layer because $H_{UA}$ is significantly lower at room temperature with these alloys. Thus, there is a clearly-felt need for a technique that enhances $H_{UA}$ in corrosion-resistant exchange-biased MR assemblies.

These unresolved problems and deficiencies are clearly felt in the art and are solved by this invention in the manner described below.

SUMMARY OF THE INVENTION

This invention increases the exchange-bias field $H_{UA}$ in an MR sensor assembly at room temperature by adding a high-iron NiFe alloy transition layer to the interface region of the NiFe/FeMn system. This is accomplished by increasing the iron/nickel ratio from the low-iron content preferred in the MR sensor strip to a high-iron content at the direct atomic contact boundary. This avoids the disadvantageous effects of increased MR element coercivity that would arise from merely increasing iron content throughout the MR strip.

It is an object of this invention to increase the exchange-bias field $H_{UA}$ magnitude in the MR sensor strip at room temperature without reducing the critical temperature of the sensor assembly. It is an advantage of the system of this invention that the exchange-bias field $H_{UA}$ is increased by as much as 50% at room temperature without significantly affecting the critical temperature $T_{cr}$.

It is another object of this invention to increase $H_{UA}$ magnitude in MR sensors using corrosion-resistant antiferromagnetic layers. It is an advantage of this invention that adding the same optimized ferromagnetic layer improves exchange-biasing sufficiently to increase $H_{UA}$ at room temperature even when using the less-effective corrosion-resistant antiferromagnetic material. It is yet another advantage of this invention that the additional optimized interface layer provides substantially the same exchange-bias field strength with corrosion-resistant antiferromagnetic material as is available from the more effective antiferromagnetic material without the additional ferromagnetic layer.

The foregoing, together with other objects, features and advantages of this invention, will become more apparent when referring to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION OF THE PREFERRED EMBODIMENT

Figure 1:
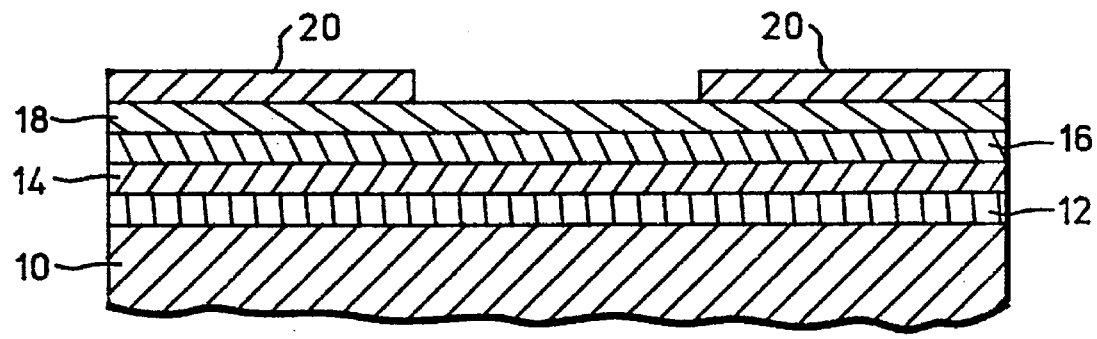
FIG. 1 is an end view of a normal exchange-biased embodiment of a magnetoresistive (MR) sensor from the prior art.

FIG. 1 shows a typical thin-film magnetoresistive (MR) sensor from the prior art deposited on a substrate 10. A transverse biasing layer 12 is first deposited. Next, a nonmagnetic spacer layer 14 is deposited followed by the MR layer 16, which is formed of a ferromagnetic material such as $Ni_{80}Fe_{20}$. Finally, an antiferromagnetic layer 18 is deposited in intimate contact with MR layer 16 to form an exchange-biased interface between layers 16 and 18. MR layer 16 is attached to the two electrical conductors 20 and provides therebetween the sensing resistance, which modulates a sensing current through MR layer 16. The output current from MR layer 16 is a signal that enables a separate sensing circuit (not shown) to determine resistance changes in MR layer 16. These resistance changes are a (usually linear) function of the magnetic fields intercepted by MR layer 16 from the recorded data on a magnetic storage medium (not shown) in the manner well-known in the art.

Transverse bias layer 12 provides a magnetic field oriented generally perpendicular to the storage medium (not shown) so as to bias the magnetic field in MR layer 16 in a direction non-parallel to the storage medium. This transverse bias field maintains the MR layer 16 in a linear response mode so that the output current is essentially a linear function of the change in resistance arising from incident magnetic fields. As is known in the art, the transverse bias field can be provided by shunt biasing, soft film biasing or permanent magnet biasing.

To ensure that MR layer 16 has unidirectional anisotropy, antiferromagnetic layer 18 is disposed in direct atomic contact with MR layer 16. Antiferromagnetic layer 18, which in the prior art may be the gamma phase of a manganese alloy, creates an interface exchange coupling with the ferromagnetic material in MR layer 16. This results in a longitudinal exchange bias field in MR layer 16 sufficient to create a single-domain state in MR layer 16. The single-domain state of MR layer 16 is necessary to suppress Barkhausen noise, which is associated with MR materials having multiple magnetic domain states. A more comprehensive description of the unidirectional surface anisotropy associated with exchange coupling is provided in the above-cited Hempstead, et al. patent.

Figure 2:
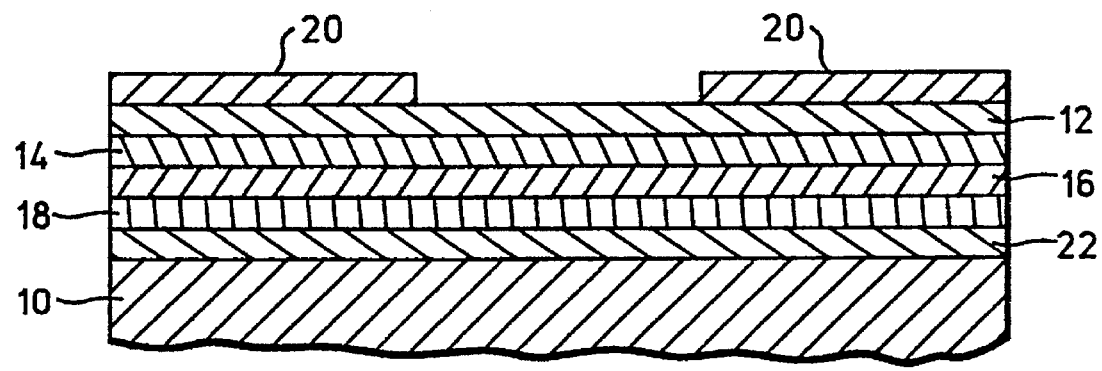
FIG. 2 is an end view of an inverted exchange-biased embodiment of a MR sensor from the prior art.

FIG. 2 shows an alternate inverted MR sensor embodiment from the prior art in which a face-centered cubic (FCC) structure is provided by an auxiliary layer 22 such as copper or palladium. Auxiliary layer 22 permits deposition of antiferromagnetic layer 18 before depositing MR layer 16 because the proper FCC structure normally provided by MR layer 16 is instead provided by auxiliary layer 22, which in a specific embodiment is 0.1 microns of metallic copper. In FIG. 2, spacer layer 14 and transverse bias layer 12 are deposited after deposition of MR layer 16. Hempstead et al. teach that, in the absence of a FCC structure upon which to deposit antiferromagnetic layer 18, no exchange coupling occurs between layers 18 and 16. Independent of processing conditions, the bias field $H_{UA}$ in MR layer 16 peaks at an antiferromagnetic layer 18 thickness of about 100 Å and falls off rapidly with increasing thickness related to the structural transformation of antiferromagnetic layer 18. For lower and higher thicknesses of antiferromagnetic layer 18, the exchange coupling field $H_{UA}$ is substantially similar to the field strength obtained using the embodiment of FIG. 1.

This invention arises from the unexpectedly advantageous observation that the exchange bias field magnitude $H_{UA}$ depends on both layers 16 and 18 while the temperature-dependence of $H_{UA}(T)$ depends primarily on only antiferromagnetic layer 18, which has a weaker magnetic order than MR layer 16. MR layer 16 consists of two atomic species, nickel and iron, and generally these two species exhibit different strengths of exchange-coupling to antiferromagnetic layer 18. This difference is exhibited in FIG. 5, which shows the results of a series of experimental studies by the inventors of the thin-film structure of this invention shown in FIG. 3.

Figure 3:
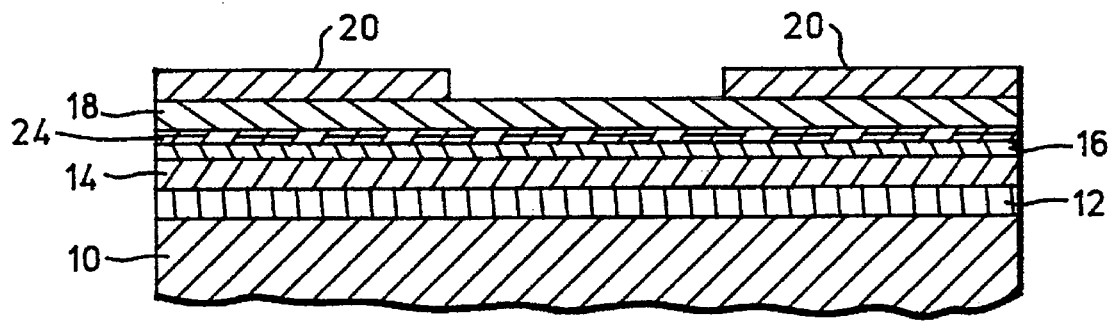
FIG. 3 is an end view of a normal embodiment of the MR sensor assembly according to this invention.
Figure 5:
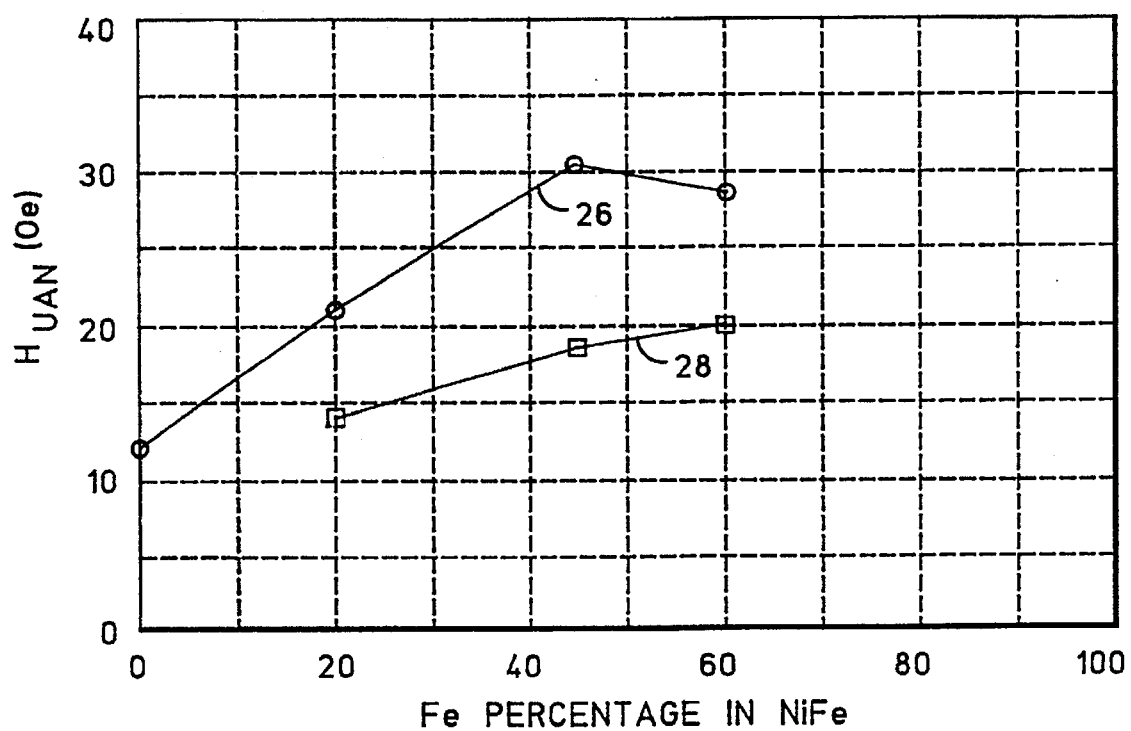
FIG. 5 is a graph of normalized exchange-bias field $H_{UAN}$ as a function of the iron content of the ferromagnetic MR layer.

FIG. 3 represents the prior art structure of FIG. 1 with the additional transition layer 24 of this invention deposited at the interface between layers 16 and 18. Transition layer 24 may be fabricated over a range of nickel and iron composition ratios. FIG. 5 shows the normalized exchange-bias field $H_{UAN}$ as a function of the iron content of the NiFe alloy in transition layer 24. The curve 26 represents experimental measurements of the structure in FIG. 3 wherein layer 18 is 200 Å of FeMn, layer 16 is 400 Å of NiFe and transition layer 24 is 50 Å of $Ni_{(1-x)}Fe_{(x)}$, where x is the percentage of iron in the nickel-iron alloy. Curve 28 in FIG. 5 represents the same structure described for curve 26 except the antiferromagnetic layer 18 alloy is composed of FeMnCr (3%).

The curves in FIG. 5 confirm that the iron in layer 24 is significantly more effective than the nickel in coupling to the antiferromagnetic layer 18. For example, the 0% iron (pure nickel) alloy shows only 60% of the $H_{UAN}$ found for $Ni_{80}Fe_{20}$ alloy and the $Ni_{55}Fe_{45}$ alloy shows almost 150% of the exchange bias field $H_{UAN}$ of the $Ni_{80}Fe_{20}$ alloy. However, the $Ni_{40}Fe_{60}$ alloy is less useful than the $Ni_{55}Fe_{45}$ alloy, for unknown reasons. The inventors suspect that the $Ni_{40}Fe_{60}$ material (pressed powder) was of poor quality compared with the other vacuum cast alloys used in the experimental measurements, but the unexpected result may also arise from a basic weakening of the ferromagnetic order as the transition layer 24 material approaches the non-magnetic $Ni_{25}Fe_{75}$ composition.

Figure 6:
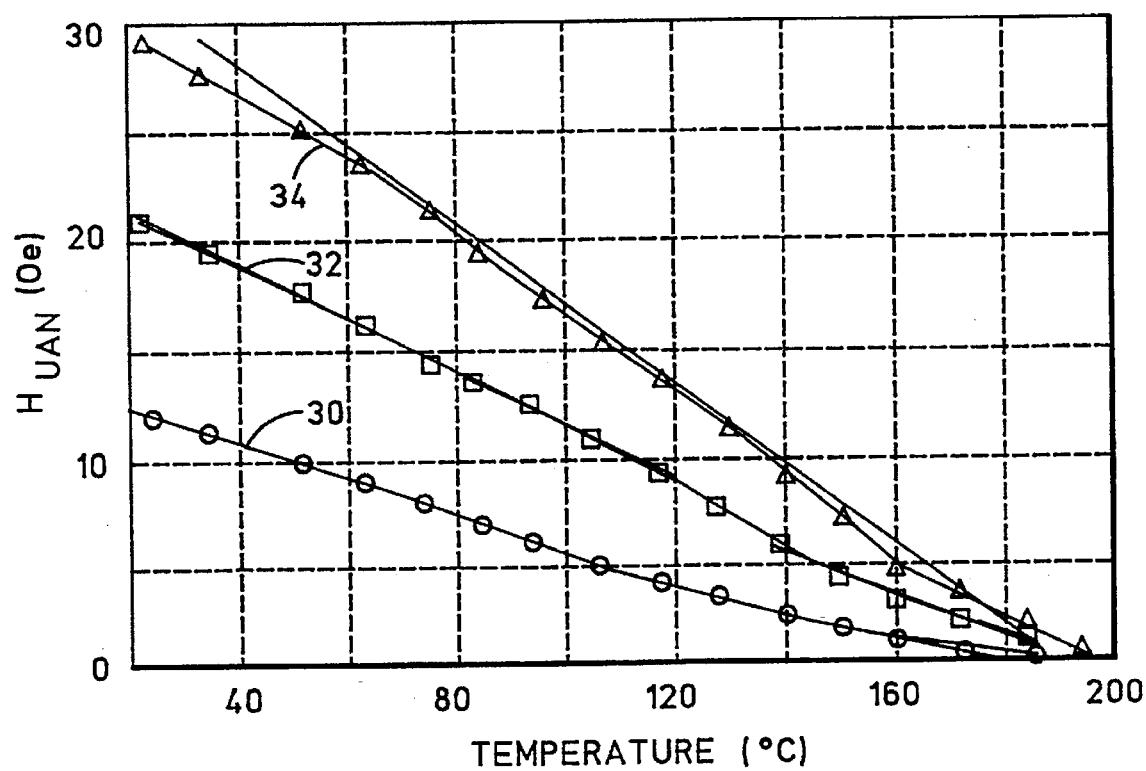
FIG. 6 is a graph of normalized exchange-bias field $H_{UAN}$ as a function of operating temperature for several combinations of materials.

FIG. 6 shows the measured temperature dependence of the exchange-bias field $H_{UAN}$ for the several materials discussed above. The curves 30, 32 and 34 in FIG. 6 represent the materials and characteristics summarized below in Table 1.

TABLE 1

| FIG. 6 Curve | Percent Fe | $H_{UAN}$ @ 20° C. | $T_{cr}$ |
| --- | --- | --- | --- |
| 30 | 0% | 12.4 Oe | 168° C. |
| 32 | 20% | 21.2 Oe | 183° C. |
| 34 | 45% | 30.4 Oe | 182° C. |

Except for the pure nickel material (curve 30), FIG. 6 shows that the critical (or "blocking") temperature $T_{cr}$ remains substantially unchanged over a range of ferromagnetic transition layer 24 compositions.

Figure 7:
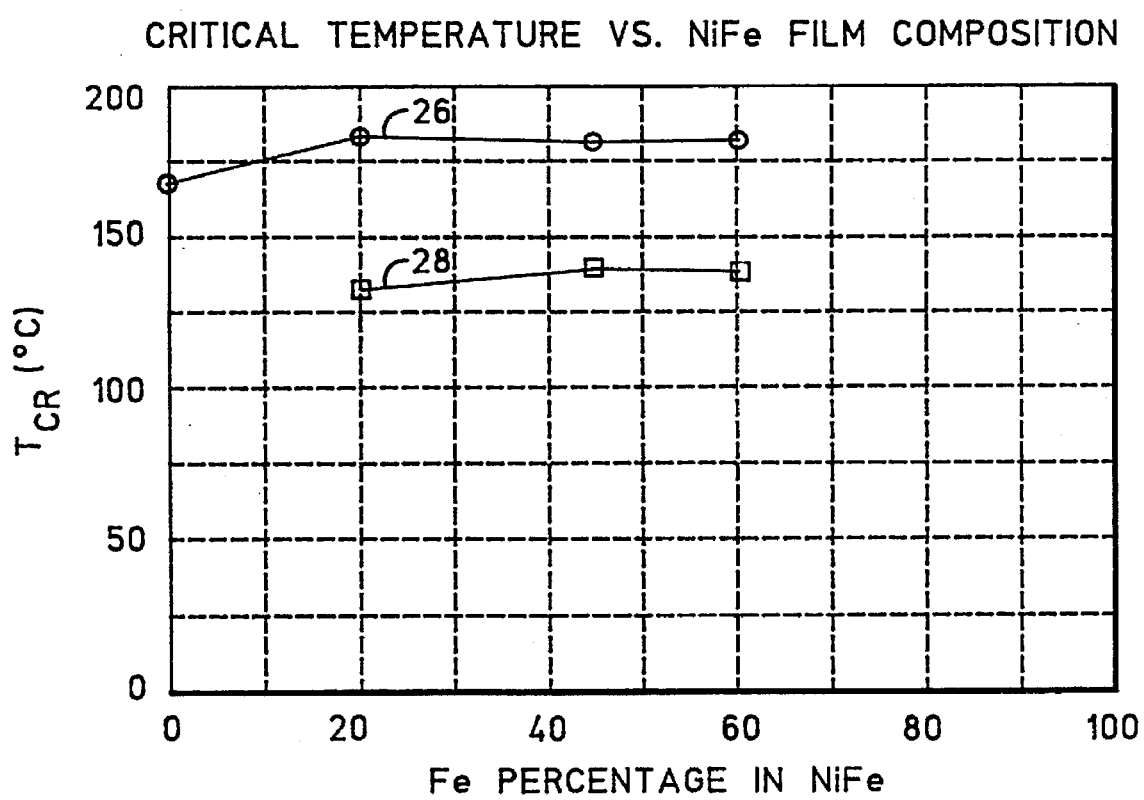
FIG. 7. is a graph of critical temperature $T_{cr}$ as a function of the iron content of the ferromagnetic MR layer.

FIG. 7 shows the relationship between critical temperature $T_{cr}$ and the percentage of iron in transition layer 24 of FIG. 3. Curves 26 and 28 in FIG. 7 represent the analogous layer 16 and 18 materials described above in connection with curves 26 and 28 of FIG. 5. Note that critical temperature $T_{cr}$ is essentially independent of transition layer composition, other than for the pure nickel material.

FIGS. 5-7 show that a high iron content at the interface between the ferromagnetic and antiferromagnetic layers in an exchange-biased MR sensor assembly offers the unexpected advantages of improved exchange-bias $H_{UAN}$ magnitude at room temperature without significant change in the critical temperature for which $H_{UAN}=0$. Accordingly, the MR sensor assembly of this invention includes a specially optimized ferromagnetic transition layer 24 at the interface region between MR layer 16 and antiferromagnetic layer 18. With transition layer 24, the interface coupling between layers 18 and 16 is significantly enhanced without materially affecting the temperature characteristics of the exchange bias field $H_{UAN}$. This simple and direct approach unexpectedly increases the exchange-bias magnitude in all MR sensor applications.

For instance, in FIG. 3, transition layer 24 is introduced as part of MR layer 16 by increasing the percentage of iron in the nickel-iron alloy at the interface with antiferromagnetic/layer 18. Similarly, in FIG. 4, transition layer 24 is introduced between layer 16 and 18 in the "inverted" configuration discussed above in connection with FIG. 2. In either FIG. 3 or FIG. 4, transition layer 24 can be optimized such that the iron-to-nickel ratio maximizes the exchange bias field $H_{UAN}$ MR layer 16.

Figure 8:
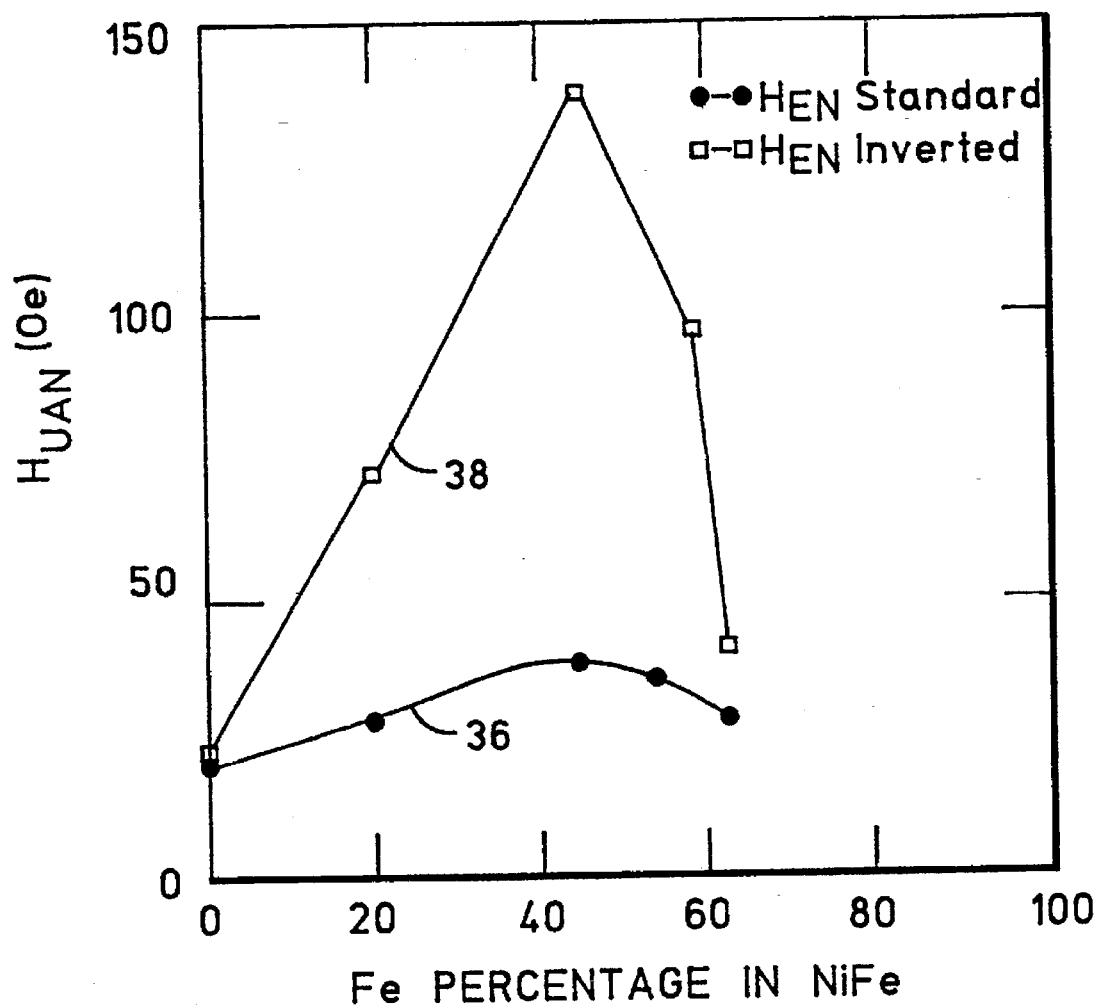
FIG. 8 is a graph of normalized exchange-bias field $H_{UAN}$ as a function of the iron content of the ferromagnetic MR layer for the standard and inverted embodiments of FIGS. 3 and 4.

FIG. 8 shows the results of additional experimental measurements using the transition layer technique of this invention discussed above in connection with FIGS. 3 and 4. In FIG. 8, curve 36 shows the relationship between exchange-bias field $H_{UAN}$ magnitude and the percentage of iron in the ferromagnetic transition layer 24 of FIG. 3. Similarly, curve 38 shows the same relationship for the inverted configuration of FIG. 4. The measurements shown in FIG. 8 employed the following materials:

Layer 14: Glass;
Layer 16: 400 Å of 80–20 NiFe;
Layer 24: 40 Å of $Ni_{(1-x)}Fe_{(x)}$ where x=[0,0.6];
Layer 18: 200 Å of $Mn_{50}Fe_{50}$;
Layer 22: 1000 Å of metallic copper; and
Closing layer (not shown): 200 Å of metallic tantalum.

Figure 4:
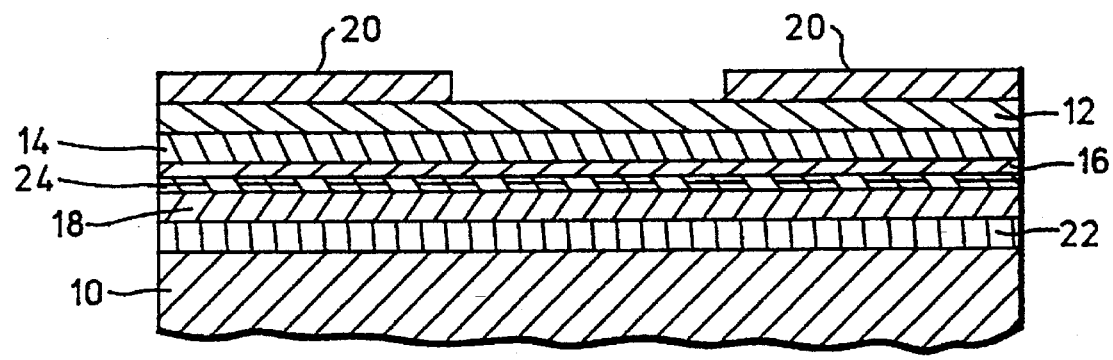
FIG. 4 is an end view of an alternate inverted embodiment of the MR sensor assembly according to this invention.

Curve 38 in FIG. 8 shows that the inverted configuration of FIG. 4 yields significant exchange-bias enhancement of up to 200% with insertion of the 40 Å transition layer 24 of this invention.

The high iron content NiFe alloy is only one example of a ferromagnetic layer that better couples with the antiferromagnetic layer than does the usual $Ni_{80}Fe_{20}$ alloy. Other ferromagnetic materials may also be used to provide as good or perhaps better exchange coupling than the enhanced nickel-iron alloys discussed above. For instance, ferromagnetic films containing alloys of nickel with iron and perhaps manganese, cobalt, chrome, palladium and other magnetic species should be useful for transition layer 24 in FIGS. 3–4.

Also, by introducing transition layer 24, the corrosion-resistant MR sensor assembly employing FeMnCr (3%) as antiferromagnetic layer 18 can also be improved as shown in curve 28 of FIG. 5. If $Ni_{40}Fe_{60}$ is used in MR layer 16 together with FeMnCr (3%) as antiferromagnetic layer 18, the room temperature exchange bias field $H_{UAN}$ of 20 Oersteds nearly equals the 21 Oersteds obtained for the typical $Ni_{80}Fe_{20}$ MR layer 16 with the more active FeMn antiferromagnetic layer 18 (curve 26 in FIG. 5).

The method and apparatus of this invention may be combined with other useful MR sensor improvement techniques known in the art. For instance, increased ferromagnetic biasing performance may be obtained not only from direct thin-film deposition procedures but also by the appropriate thermal treatments of the original exchange-coupled films such as NiFe/FeMn. Various such procedures are discussed above in connection with the existing art. Also, where 80–20 Permalloy material is not absolutely required for the usual exchange-biased MR sensor system, the entire MR ferromagnetic layer 16 may be replaced by a ferromagnetic material specially optimized to exchange-coupling to the antiferromagnetic layer 18. Normally, the 80–20 NiFe alloy is preferred because of its lower (10 Oersted) coercivity, which must be overcome by the exchange-bias field. However, through the use of other antiferromagnetic materials and optimized exchange-coupling, the higher-coercivity MR layer 16 material may be also advantageously used in conjunction with the method of this invention.

Figure 9A:
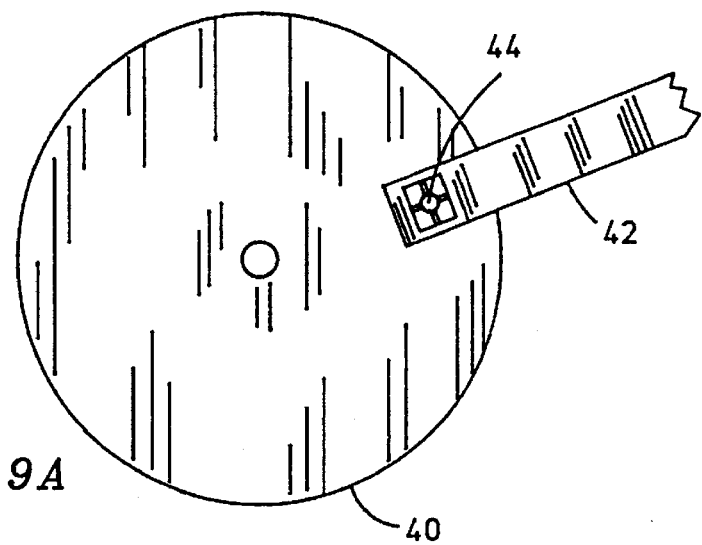
FIGS. 9A–9B show a functional schematic illustration of a Direct Access Storage Device (DASD) employing the MR sensor assembly of this invention.
Figure 9B:
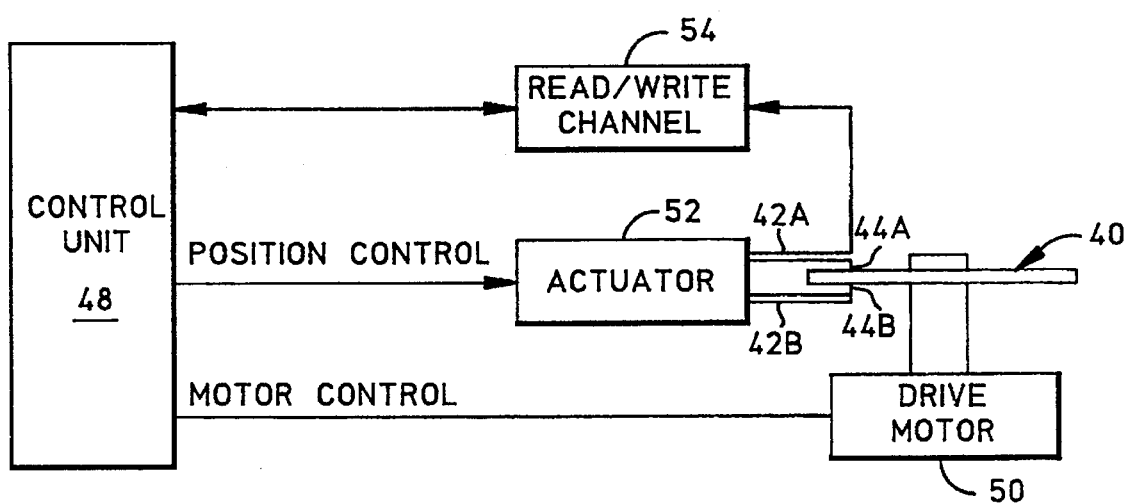

The magnetoresistive sensor of this invention is suitable for use with magnetic data storage devices such as the Direct Access Storage Device (DASD) illustrated in FIG. 9B. FIG. 9A shows a data storage disk 40 disposed adjacent to an actuator arm 42, which includes a MR sensor assembly 44. FIG. 9B shows a DASD 46 in schematic form, including data storage disk 40 and two actuator arms 42A and 42B, each containing MR, sensor assembly 44A and 44B, respectively. DASD 46 includes a control unit 48 that coordinates the mechanical motions of a drive motor 50 and an actuator motor 52. Drive motor 50 rotates disk 40 and actuator motor 52 translates actuator arms 42A–42B to position heads 44A–44B radially with respect to disk 40. MR sensor assemblies 44A and 44B operate to read magnetically-encoded data stored on the surfaces of disk 40 and these data are transferred through a read/write channel 54 to control unit 48 in a manner well-known in the art.

Clearly, other embodiments and modifications of this invention will occur readily with those of ordinary skill in the art in view of these teachings. Therefore, this invention is to be limited only by the following claims, which include all such embodiments and modifications when viewed in conjunction with the above specification and accompanying drawing.

We claim:

1. An exchange-biased magnetoresistive (MR) sensor comprising:

an antiferromagnetic layer;

a first MR ferromagnetic layer comprising an alloy of nickel and iron; and a second MR ferromagnetic layer comprising an alloy of nickel and iron and being interposed between the antiferromagnetic layer and the first MR ferromagnetic layer, the second MR ferromagnetic layer contacting both the antiferromagnetic layer and the first MR ferromagnetic layer and having an elevated percentage of iron with respect to iron percentage in the first MR ferromagnetic layer.

2. The sensor of claim 1 wherein said antiferromagnetic layer comprises an alloy of iron and manganese, FeMn.

3. The sensor of claim 2 wherein said antiferromagnetic layer comprises a FeMnX alloy, where X is an element selected from a group comprising chrome (Cr), rhodium (Rh) and titanium (Ti).

4. The sensor of claim 1 wherein iron percentage in the second MR ferromagnetic layer varies continuously between an upper value and said lower value as a function of distance from said antiferromagnetic layer.

5. The sensor of claim 4 wherein said upper value is between 40% and 60%.

6. The sensor of claim 1 wherein iron percentage in the second MR ferromagnetic layer is between 40% and 60%.

7. The sensor of claim 1, wherein said second MR ferromagnetic layer is less than one-fourth the thickness of the first MR ferromagnetic layer.

8. The sensor of claim 1, where the first MR ferromagnetic layer is about 400 Å thick and the second MR ferromagnetic layer is about 50 Å thick.

9. A magnetic thin-film structure including a sandwich composed of layers, said structure comprising:

a first layer of antiferromagnetic material;

a second layer having a ferromagnetic material with a coercivity $H_c$ and including first and second sub-layers each comprising alloys of iron, the second sub-layer being interposed between the antiferromagnetic material and the first sub-layer, the second sub-layer contacting the first layer and the first sub-layer, said second layer having a unidirectional magnetic bias $H_e$ sustained by an exchange anisotropic interaction with said first layer arising from molecular spin alignment in said antiferromagnetic material, wherein:

the percentage of molecular iron in second sub-layer exceeds molecular iron percentage in the first sub-layer.

10. The magnetic thin-film structure of claim 9 wherein said first layer comprises an iron-manganese (FeMn) alloy.

11. The magnetic thin-film structure of claim 10 wherein said first layer comprises a FeMnX alloy, where X is an element selected from a group comprising chrome (Cr), rhodium (Rh) and titanium (Ti).

12. The magnetic thin-film structure of claim 9 wherein said percentage of molecular iron in said second sub-layer varies continuously between a predefined upper limit and a predefined lower limit as a function of distance from said antiferromagnetic material.

13. The magnetic thin-film structure of claim 12 wherein said upper limit is between 40% and 60%.

14. The magnetic thin-film structure of claim 9 wherein:

iron percentage in the second sub-layer is between 40% and 60%.

* * * * *